United States Patent
Dighe et al.

[11] Patent Number: 4,828,607
[45] Date of Patent: May 9, 1989

[54] REPLACEMENT OF COKE IN PLASMA-FIRED CUPOLA

[75] Inventors: Shyam V. Dighe, North Huntingdon; Bradley A. Buczkowski, Saginaw, Mich.; Walter J. Peck, Defiance, Ohio; Seymour Katz, Huntingdon Woods, Mich.; William H. Provis, Port Washington, Wis.

[73] Assignee: Electric Power Research Institute, Palto Alto, Calif.

[21] Appl. No.: 47,808

[22] Filed: May 8, 1987

[51] Int. Cl.⁴ ............................................. C22B 4/00
[52] U.S. Cl. ................................. 75/10.22; 75/10.19; 75/44 S
[58] Field of Search ................ 75/10.22, 10.19, 44 S; 373/19

[56] References Cited

U.S. PATENT DOCUMENTS

| 4,001,008 | 1/1977 | Stift | 75/10.19 |
| 4,530,101 | 7/1985 | Fey | 373/19 |
| 4,611,332 | 9/1986 | Santen | 75/10.22 |

*Primary Examiner*—Peter D. Rosenberg
*Attorney, Agent, or Firm*—Fred J. Boehr, Jr.

[57] ABSTRACT

A plasma-fired cupola is operated utilizing anthracite or bituminous coal or small size coke to replace foundry coke to melt turnings, borings and chips from machining cast iron and steel, wherein the turnings, borings and chips make up as much as 75% by weight of the metal charge, the remaining portion of the charge being larger scrap; adding alloy oxides to provide the alloy element in the iron produced and providing up to 25% of the carbon required as pulverized coal added via a plasma torch feed nozzle to economically produce a variety of irons in the plasma-fired cupola.

16 Claims, 2 Drawing Sheets

REPLACEMENT OF COKE IN PLASMA-FIRED CUPOLA

BACKGROUND OF THE INVENTION

This invention relates to a cupola and more particularly to a cupola which receives a portion of its heat input from a plasma torch so fuels other than coke may be utilized.

The cupola is a vertical cylindrical shaft furnace in which normally alternate layers of coke, metal scrap and fluxing material such as lime stone are layered and the coke is ignited and burned melting the scrap to make iron. In the plasma fired cupola part of the heat energy is supplied by a plasma torch.

U.S. Pat. No. 4,530,101 describes a plasma-fired cupola where plasma torches are utilized to melt metal turnings in nozzles which are connected to the lower end of the cupola.

A related application entitled "PLASMA-FIRED FEED NOZZLE" filed May 8, 1987 and assigned Ser. No. 47,811 describes how a plasma torch and nozzle are attached to the cupola and may be utilized to feed particular material and gases to the lower portion of the cupola.

An application entitled "PLASMA-FIRED CUPOLA" filed on May 8, 1987 and assigned Ser. No. 47,809 describes how the plasma-fired cupola can be utilized to melt turnings and fine chips making up approximately 75% of the metal charge in the cupola.

An application entitled "CONTROL OF A PLASMA-FIRED CUPOLA" filed May 8, 1987 and assigned Serial No. 47,810 describes how the plasma-fired cupola is controlled. A paper published by the inventor July 1985 entitled "Test Results of a Pilot Scale Plasma-Fired Cupola for Iron Chip Melting" describes the apparatus and some of the test results from operating the apparatus. However, there is no suggestion of replacing the coke with coal or very fine coke.

SUMMARY OF THE INVENTION

In general, a method of operating a plasma-fired cupola comprises the steps of: providing a plasma torch and feed nozzle adjacent the lower portion of the cupola; providing a charging door adjacent the upper portion of the cupola; providing a metal charge consisting of metal scrap; providing a coal charge other than foundry size coke; providing a fluxing material charge; placing the metal, coal and fluxing material charges in the cupola and operating the plasma torch to produce iron.

BRIEF DESCRIPTION OF THE DRAWINGS

The objects and advantages of this invention will become more apparent by reading the following detailed description in conjunction with the accompanying drawings, in which.

DESCRIPTION OF THE PREFERRED EMBODIMENT

Figure 1:
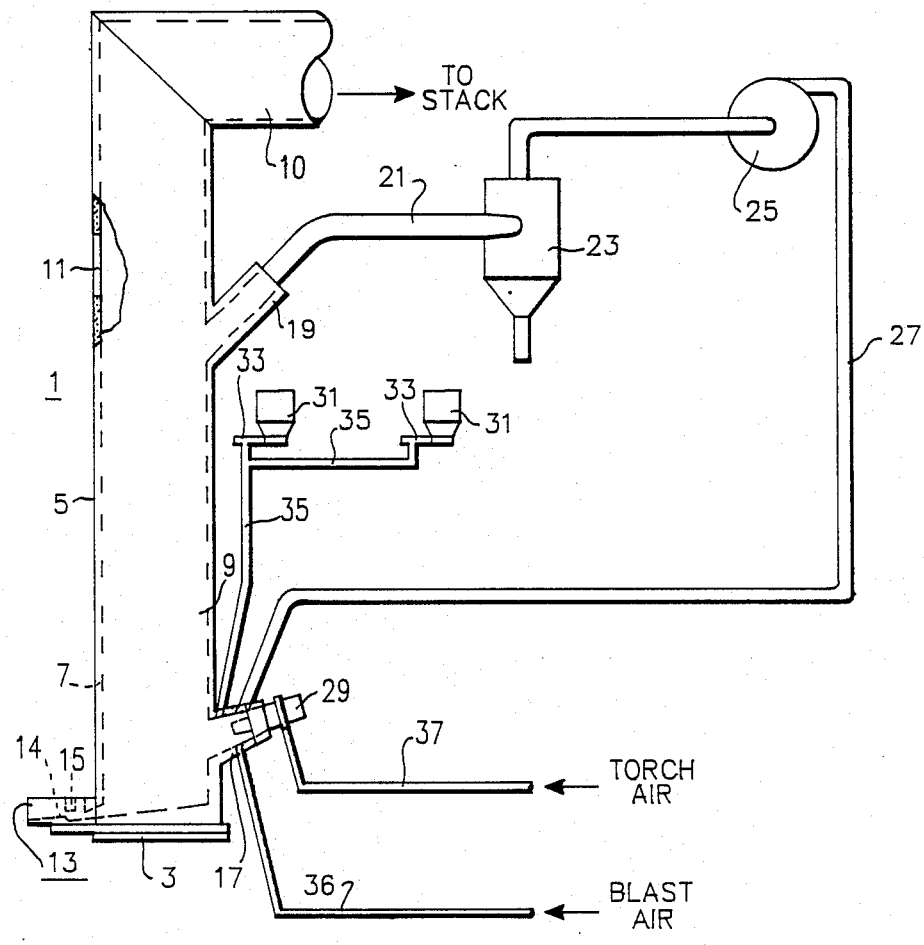
FIG. 1 is a schematic view of the plasma-fired cupola made in accordance with this invention.

Referring now to the drawings in detail there is shown a cupola 1, which is a furnace having a base portion 3 and a vertical, cylindrical housing 5 extending from the base, the base and housing 5 are lined with fire bricks 7 or other refractory material generally forming an unobstructed round open shaft 9 with an off-gas conduit 10 connecting the upper end of the shaft 9 to a stack (not shown).

A charge door (not shown) comprising of an opening 11 is disposed adjacent the upper end of the shaft for placing a charge normally comprising coke, scrap iron or steel and a fluxing material in the cupola.

Disposed adjacent the base portion 3 is a spout 13 having a dam 14 and a skimmer 15 which separate molten iron and slag that are separately drawn from the spout 13.

A plasma torch nozzle 17 is disposed in fluid communication with the lower portion of the shaft 9 while only one plasma torch nozzle 17 is shown, it is understood that any number of such plasma torch nozzles may be utilized depending on size of the cupola. The plasma torch nozzle 17 is described in detail in an application entitled "PLASMA-FIRED FEED NOZZLE" filed May 8, 1987 and assigned Serial No. 47,811 which is hereby incorporated by reference.

An off-gas nozzle or take-off 19 is disposed in fluid communication with the shaft 9 generally below the charge opening 11, however, its location is not critical, but it should generally be above the charge level. A conduit or duct 21 extends from the off-gas nozzle or take-off 19 to a cyclone separator 23 utilized to remove particulate material from the off-gas. There is a blower 25 disposed in a conduit or duct 27 which provides fluid communication between the cyclone separator 23 and the plasma torch nozzle 17.

A plasma torch 29 is disposed in the end of the plasma torch nozzle 17 opposite the end opening into the cupola 1.

Two particulate material bins 31 are disposed above the plasma torch nozzle 17, each bin 31 has a screw auger 33 or other feeding means for feeding particulate material from the respective bin at a control rate to a conduit 35 which directs the particulate material to the plasma torch nozzle 17.

A blast air conduit or duct 36 is disposed in fluid communication with the plasma torch nozzle 17 and supplies combustion air for the coke or coal. A conduit 37 supplies air to the plasma torch 29.

Figure 2:
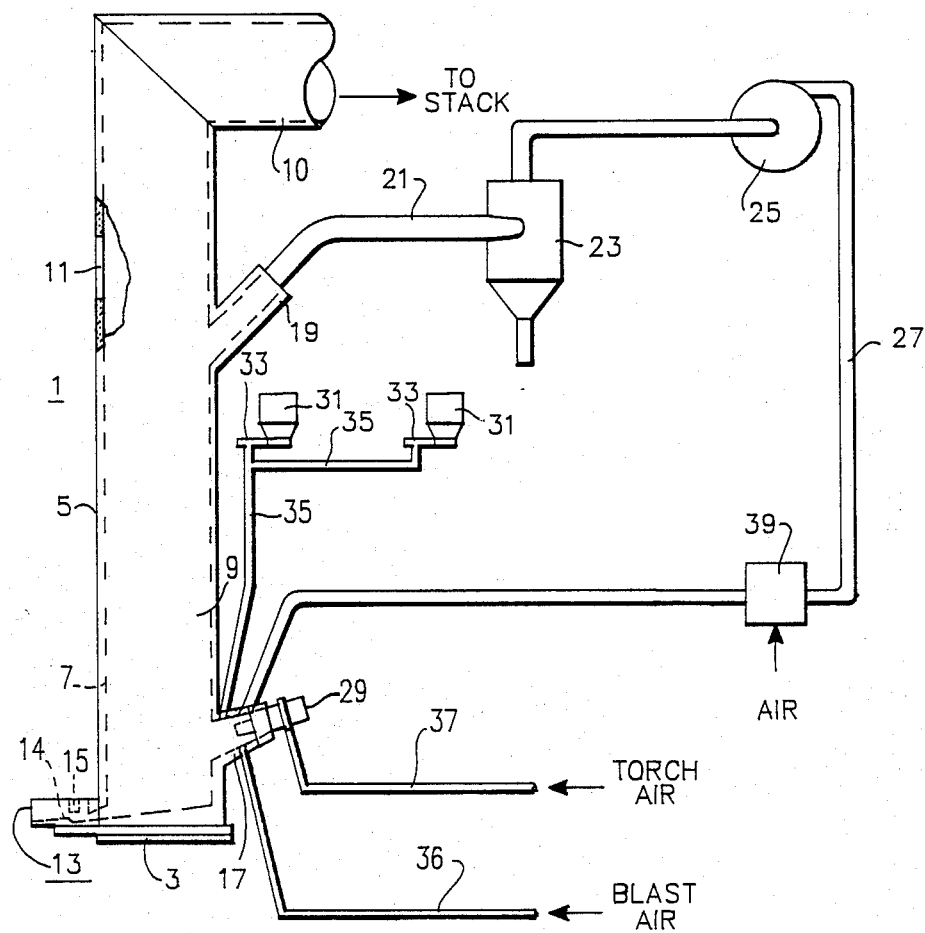
FIG. 2 is a schematic view of an alternative embodiment of the plasma-fired cupola.

FIG. 2 shows a cupola 1 with the items shown in FIG. 1 with the addition of a combustion 39 disposed in the conduit 27 for burning the combustible products in the off gas and adding heat energy to the cupola. The combustor 39 would have particular application where anthracite or bituminous coal are utilized to replace the coke normally used in a cupola.

The operation of the plasma-fired cupola is as follows. A metal charge is made up of turnings and larger scrap wherein the turnings may be as much as 75% by weight of the metal charge and comprise turnings, borings and chips from machining cast iron or steel parts and may includes scrap having large surface area to volume ratio and also include relatively small size chips or metal particles. A coal charge 5 to 15% by weight of the metal charge may be made up of anthracite or bituminous coal or non-foundry size coke. Foundry size coke is normally 7 to 8 inches in size and has 90 to 95% fixed carbon and less then 5 to 8% ash. Foundry size coke is relatively expensive. Less expensive, non-regular small size coke ranging in size 2 to 3 inches and down to ½ to 1 inch can be utilized. Also, anthracite coal and bituminous coal can also be substituted for the coke.

However, low sulfur coal is preferred in order to reduce the sulfur content of the iron. Pulverized or small size coke can also be injected via the plasma torch nozzle 17 and can generally supply up to 25% of the carbon requirement of the cupola. A fluxing material such as limestone or other fluxing agent in the range of 5 to 10% by weight of the metal charge is also required. A bed of coal is laid in the lower portion of the cupola, and the plasma torch 29 is utilized to ignite the coal, which is burned to initially heat the cupola. Then coal, metal and fluxing materials are layered in the heated furnace and the power level of the plasma torch and amount of air fed to the cupola are regulated to melt the scrap to make iron.

The velocity of the gas through the charge is held at a low level generally less than one SCFM per square inch of cupola cross-sectional area, $2.7 \times 10^{-3}$ cubic meters per second per square centimeter of cupola cross-sectional area due to the fact that the plasma torch supplies a large portion of the heat energy required to melt the scrap and substantially reducing the amount of air required to burn the coal.

Off-gas is passed through a cyclone separator and recirculated through the plasma torch nozzle 17 in order that the atmosphere within the cupola can be a reducing atmosphere substantially reducing the rate at which the coal is burned. The reducing atmosphere also allows alloy oxides to be added to provide the alloy material for the iron. One way of adding an alloy oxide, i.e., $SiO_2$, $Cr_2O_3$ or $MnO_2$ is to mix the alloy oxide with a binder such as a resin and press the mixture to form briquettes or mix the alloy oxide with pulverized coke or coal and add a resin binder and press the mixer to form briquettes. These briquettes may be added to the cupola via the charging door or in front of the plasma torch through the nozzle. A typical mixer would contain 70% $SiO_2$, 2% resin and 28% coke or other coal which would have a carbon content of about 25%. An alloy oxide may be dumped directly into the bin and fed to the plasma torch feed nozzle and be heated by the plasma torch as it enters the reducing atmosphere. The alloy oxide will be reduced providing alloying metal to the iron. When the briquettes are formed with carbon and the alloy oxide and resin they may be crushed and the crushed particles dumped into one of the bins 31 and fed to the plasma torch nozzle. The carbonaceous material being heated by the plasma torch with the alloy oxide ensures a reducing atmosphere so that the alloy oxide is reduced as it enters the cupola and combines with the molten iron to form an iron alloy.

When bituminous or anthracite coal is utilized, a combustor is disposed in the off-gas recirculating conduit so that air can be added to the recycled off-gas to burn the combustibles contained therein providing additional heat to the cupola and if excess air is kept to a minimum a reducing atmosphere can be maintained. By injecting a carbonaceous material such as pulverized coal or coke into the plasma torch nozzle via the bins 31, the carbon content of the iron can be increased rapidly and a reducing atmosphere produced.

The apparatus and method hereinbefore described advantageously generate ferro-alloys by reduction of alloy oxides in the plasma torch nozzle 17 or in the lower portion of the cupola 1 with or without the addition of pulverized coke or coal through the plasma torch nozzle 17 by utilizing recycled off-gas to create a reducing atmosphere inside the plasma torch nozzle 17 and lower portion of the cupola 1. It can advantageously utilize alloy oxides premixed with stoichiometric portions of carbonaceous material and a binder to form briquttes which can be feed through the charge door opening 11 or crushed and fed via the plasma torch nozzle 17 to produce the desired iron alloy and finally, it can advantageously utilize coal in forms other than foundry size coke to produce iron from turnings, borings and chips formed by machining cast iron or steel and up to 25% of the carbonaceous material required can be supplied by adding pulverized coal via the plasma torch feed nozzle 17 substantially reducing the cost of the carbonaceous fuel required.

What is claimed is:

1. A method of operating a plasma-fired cupola comprising the steps of:
   providing a plasma torch and feed nozzle adjacent the lower portion of the cupola;
   providing a charging door adjacent the upper portion of the cupola;
   providing a metal charge consisting of metal scrap;
   providing a coal charge other than coke;
   providing a fluxing material charge;
   placing the metal, coal and fluxing material charge in the cupola; and
   operating the plasma torch to produce a high quality iron.

2. The method of operating a plasma-fired cupola as set forth in claim 1, wherein the step of providing coal includes providing anthracite coal.

3. The method of operating a plasma-fired cupola as set forth in claim 1, wherein the step of providing coal includes providing soft bituminous coal.

4. The method of operating a plasma-fired cupola as set forth in claim 1, wherein the step of providing coal includes providing coke having a size range from 2 to 3 inches down to ½ to 1 inch sizes.

5. The method of operating a plasma-fired cupola as set forth in claim 1, wherein 25% of the coal requirement is supplied by injecting pulverized coal via the feed nozzle.

6. The method of operating a plasma-fired cupola as set forth in claim 1 and further comprising the steps of:
   mixing a carbon-bearing material with an alloy oxide and a binder;
   compressing and drying the mixture to form briquettes; and
   supplying the briquettes to the cupola to add the alloy element of the alloy oxide to the iron.

7. The method of operating plasma-fired cupola as set forth in claim 6 and further comprising the step of crushing the briquettes and supplying the crushed briquettes to the cupola via the plasma feed nozzle.

8. The method of operating a plasma-fired cupola as set forth in claim 6 wherein the step of supplying the briquettes to the cupola comprises supplying them to the cupola via the charging door.

9. The method of separating a plasma-fired cupola as set forth in claim 1, wherein the step of providing coal comprises providing a coal which is not coke;
   drawing off the gases from the upper portion of the cupola;
   burning the gases drawn off by adding air; and
   returning the burned gases to the lower portion of the cupola to utilize the heat energy available by burning the gases.

10. The method of operating a plasma-fired cupola as set forth in claim 1 and further comprising the step of supplying an alloy metal via the plasma torch nozzle.

11. The method of operating a plasma-fired cupola as set forth in claim 10 and further comprising the step of supplying a carbon bearing material via the plasma torch nozzle.

12. A method of operating a plasma-fired cupola as set forth in claim 11 wherein the step of supplying a carbonaceous-bearing material via the plasma torch nozzle comprises supplying pulverized coke via the plasma torch nozzle.

13. The method of operating a plasma-fired cupola as set forth in claim 11 wherein the step of supplying an alloy metal via the plasma torch nozzle comprises supplying silicon diozide via the plasma torch nozzle.

14. The method of operating a plasma-fired cupola as set forth in claim 11 wherein the step of supplying an alloy metal via the plasma torch nozzle comprises supplying manganese oxide via the plasma torch nozzle.

15. The method of operating a plasma-fired cupola as set forth in claim 11 and further comprising the step of recycling gas from the top portion of the cupola to the plasma torch nozzle to produce a reducing atmosphere in the lower portion of the cupola.

16. The method of operating a plasma-fired cupola as set forth in claim 6 wherein the step of mixing a carbon-bearing material with an alloy oxide and binder comprises forming a mixture of 70% silicon dioxide, 2% resin and 28% coke.

* * * * *